(12) United States Patent
Bykov et al.

(10) Patent No.: US 11,743,474 B2
(45) Date of Patent: Aug. 29, 2023

(54) SHOT-CHANGE DETECTION USING CONTAINER LEVEL INFORMATION

(71) Applicant: Meta Platforms, Inc., Menlo Park, CA (US)

(72) Inventors: Maxim Bykov, Redwood City, CA (US); Ioannis Katsavounidis, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/459,472

(22) Filed: Aug. 27, 2021

(65) Prior Publication Data

US 2023/0060780 A1    Mar. 2, 2023

(51) Int. Cl.
*H04N 19/172* (2014.01)
*H04N 19/103* (2014.01)
*H04N 19/136* (2014.01)

(52) U.S. Cl.
CPC ......... *H04N 19/172* (2014.11); *H04N 19/103* (2014.11); *H04N 19/136* (2014.11)

(58) Field of Classification Search
None
See application file for complete search history.

(56) References Cited

U.S. PATENT DOCUMENTS

| 5,774,593 A * | 6/1998 | Zick ..................... H04N 19/179 |
| 2006/0045334 A1 | 3/2006 | Yang et al. |
| 2019/0260999 A1 | 8/2019 | Xiong et al. |

FOREIGN PATENT DOCUMENTS

EP    0810793 A2    12/1997

OTHER PUBLICATIONS

International Search report and Written Opinion for International Application No. PCT/US2022/041552, dated Dec. 8, 2022, 8 pages.

* cited by examiner

*Primary Examiner* — Christopher G Findley
(74) *Attorney, Agent, or Firm* — Greenberg Traurig, LLP (57) ABSTRACT

The disclosed computer-implemented method may include, for a current frame of a sequence of video frames, determining a frame type label of the current frame. The method may include, in response to determining that the current frame is labeled as an intra frame (I-frame), decoding the current frame and comparing the decoded frame to historical I-frame data. The method may also include, in response to the comparison satisfying a shot-change threshold, flagging the current frame as a shot-change frame, and in response to flagging the current frame as the shot-change frame, storing the current frame for a subsequent shot-change detection. The method may further include updating, based on flagged shot-change frames, shot boundaries for the sequence of video frames. Various other methods, systems, and computer-readable media are also disclosed.

20 Claims, 6 Drawing Sheets

SHOT-CHANGE DETECTION USING CONTAINER LEVEL INFORMATION

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A digital video file may include a sequence of frames (e.g., pictures). Although each frame may be stored as a complete picture, such a scheme may require significant storage space for video files. To more efficiently store video files, the frames may be compressed into various types of frames, such as intra frames and inter frames. An intra frame (e.g., "I-frame" or intra-coded picture) may include a complete image and therefore may be less compressible than other frame types but may not require other frames to decode. Inter frames may include predicted pictures (e.g., "P-frames" or delta-frames) and bidirectional predicted pictures (e.g., "B-frames"). A P-frame may include only the changes in the image from a previous or subsequent frame to reduce storage requirements. By only storing the changed pixels, a P-frame may not require storing unchanged background pixels and therefore a P-frame may be more compressible than an I-frame. A B-frame may save more space and be more compressible than a P-frame by storing differences between the current frame and combinations of both preceding and following frames.

Video content may include multiple shots aggregated into a logical unit called a "scene." A change between shots may correspond to changes in camera location, angle, pan, setting, and/or other content that may change an overall similarity between frames. Thus, a shot may be defined as a grouping of consecutive frames based on complexity or any other video processing characteristics. Tailoring encoding parameters to different video processing characteristics may produce increase video quality and/or improve system efficiency when encoding. Thus, when processing a video file, detecting shot changes within the file may identify shot boundaries to process the video file more efficiently by processing by shot.

Shot-change detection may involve decoding every frame and performing frame analysis with neighboring frames. However, such shot-change detection may be computationally expensive and, particularly at scale, may prohibit per-shot optimized encodings. In addition, prior placement of intra and inter frames may be based on a standardized scheme which may not align with shot changes. For example, the placement of intra and inter frames as they appear on input compressed video files, may be according to when they become available at an ingest stage of a processing pipeline.

The present disclosure is generally directed to shot-change detection using container level information, such as frame labels and other frame data within a compressed video file itself. As will be explained in greater detail below, embodiments of the present disclosure may identify shot-change frames by identifying which frames are labeled as or should be labeled as intra frames, decoding the intra frames for comparison to historical intra frame data, and indicating intra frames as shot-change frames based on the comparison. The systems and methods described herein may advantageously provide shot-change detection without having to decode most or all of the frames in a video. The systems and methods herein may improve the functioning of a computer itself by reducing a number of frames processed to more efficiently detect shot changes. In addition, the systems and methods herein may improve the technical field of video processing by providing more efficient shot-change detection.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-6, detailed descriptions of shot-change detection using container level information. Detailed descriptions of how frames may be ideally grouped for processing are provided with FIG. 1. A process for flagging a shot-change frame is described in conjunction with FIG. 2. Another process for flagging a shot-change frame is described in conjunction with FIG. 3. Descriptions of an exemplary system for shot-change detection are provided with FIG. 4. Descriptions of an exemplary network environment for shot-change detection are provided with FIG. 5. Descriptions of frame sizes are provided with FIG. 6.

Figure 1:
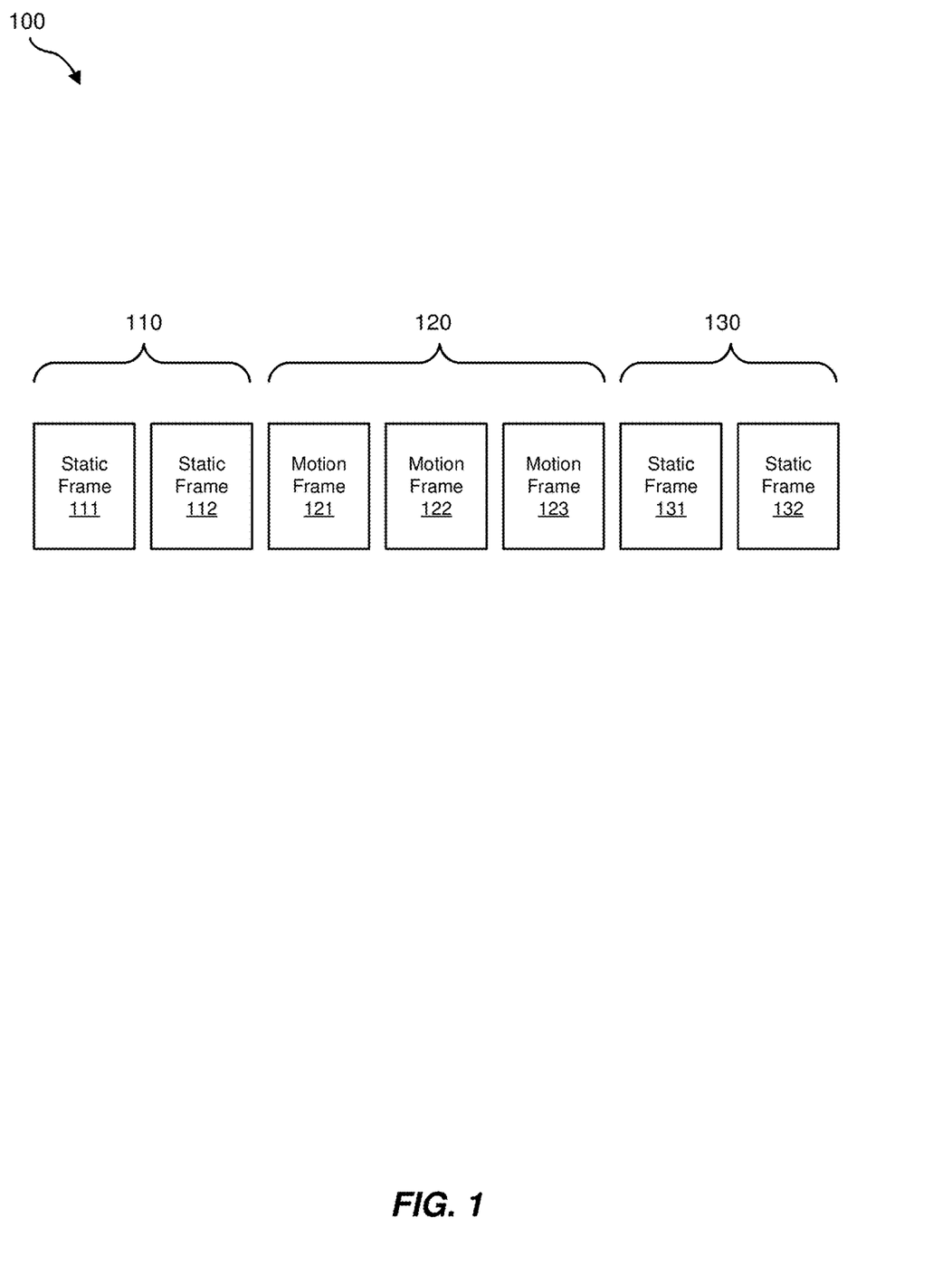
FIG. 1 is a block diagram of a sequence of frames.

FIG. 1 illustrates a video frame sequence 100 that may correspond to a video file. Video frame sequence 100 may include a static frame 111 and a static frame 112 that may form a shot 110. Video frame sequence 100 may also include a shot 120 including a motion frame 121, a motion frame 122, and a motion frame 123. Video frame sequence 100 may further include a shot 130 including a static frame 131 and a static frame 132. Video frame sequence 100 may include video that may be mostly static at the beginning and the end, but with high-motion, noisy content in the middle. Although the same encoding settings may be applied across all frames to encode video frame sequence 100, using different encoding settings for each of shot 110, shot 120, and shot 130 may improve overall quality (as compared to applying the same encoding settings) and may further facilitate various advanced video processing techniques, such as convex hull encodings and other state-of-the-art techniques.

Because the frames in FIG. 1 are pre-identified as static or motion, the shot-change boundaries (e.g., shot-change frames) may be identified as static frame 111, motion frame 121, and static frame 131. However, a given video file may not identify shot-change frames. In addition, although certain I-frames may also correspond to shot-change frames, every I-frame may not correspond to shot-change frames. For example, video encoding may place I-frames with a certain cadence (such as every second or applying an equal partition principal to evenly space I-frames). However, such a cadence may result in unnecessary I-frames in the middle of a shot. As stated above, certain shot-change detection schemes may require decoding and analyzing every frame to identify shot-change frames.

Figure 2:
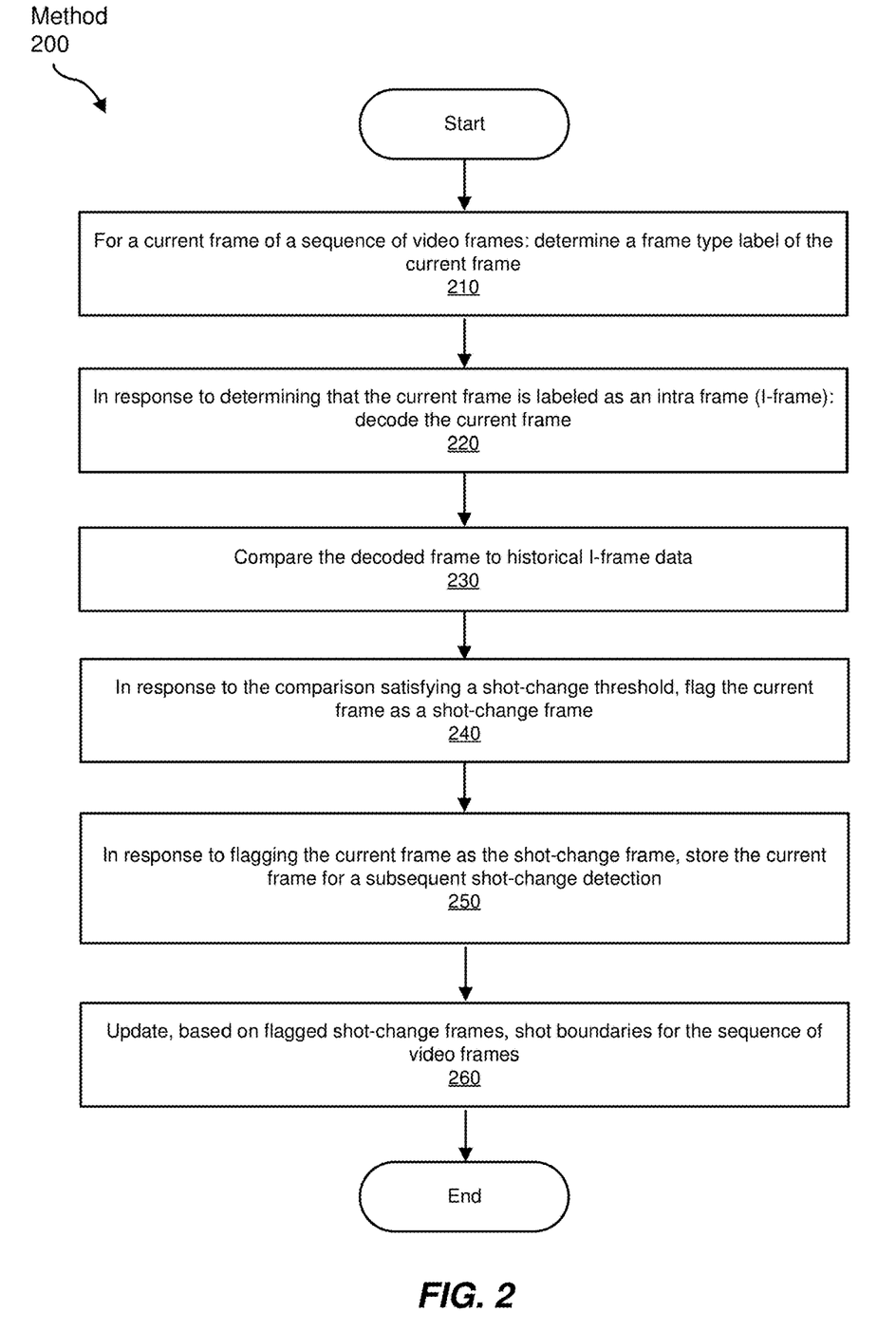
FIG. 2 is a flow diagram of an exemplary method for shot-change detection using container level information.
Figure 4:
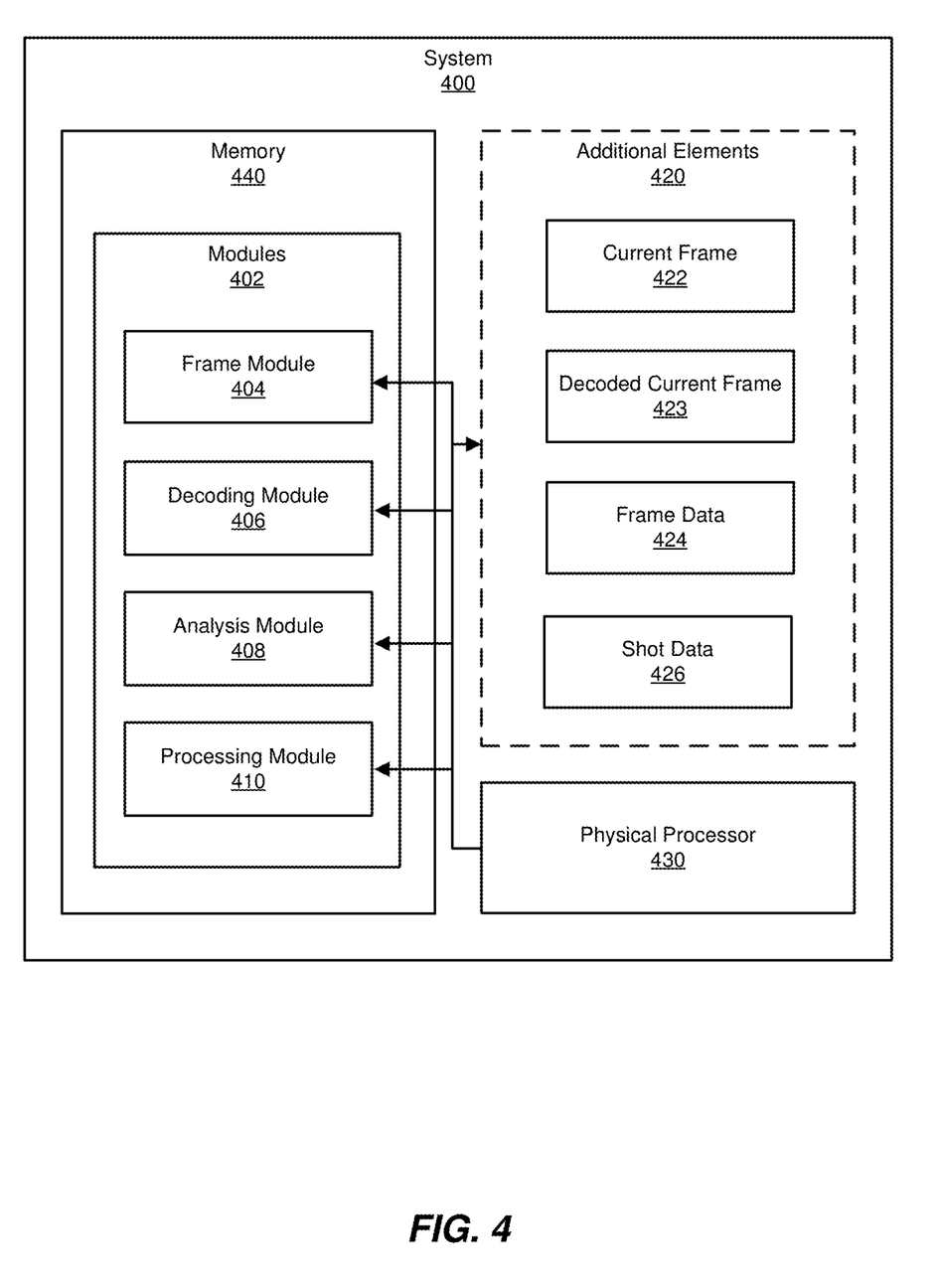
FIG. 4 is a block diagram of an exemplary system for shot-change detection using container level information.
Figure 5:
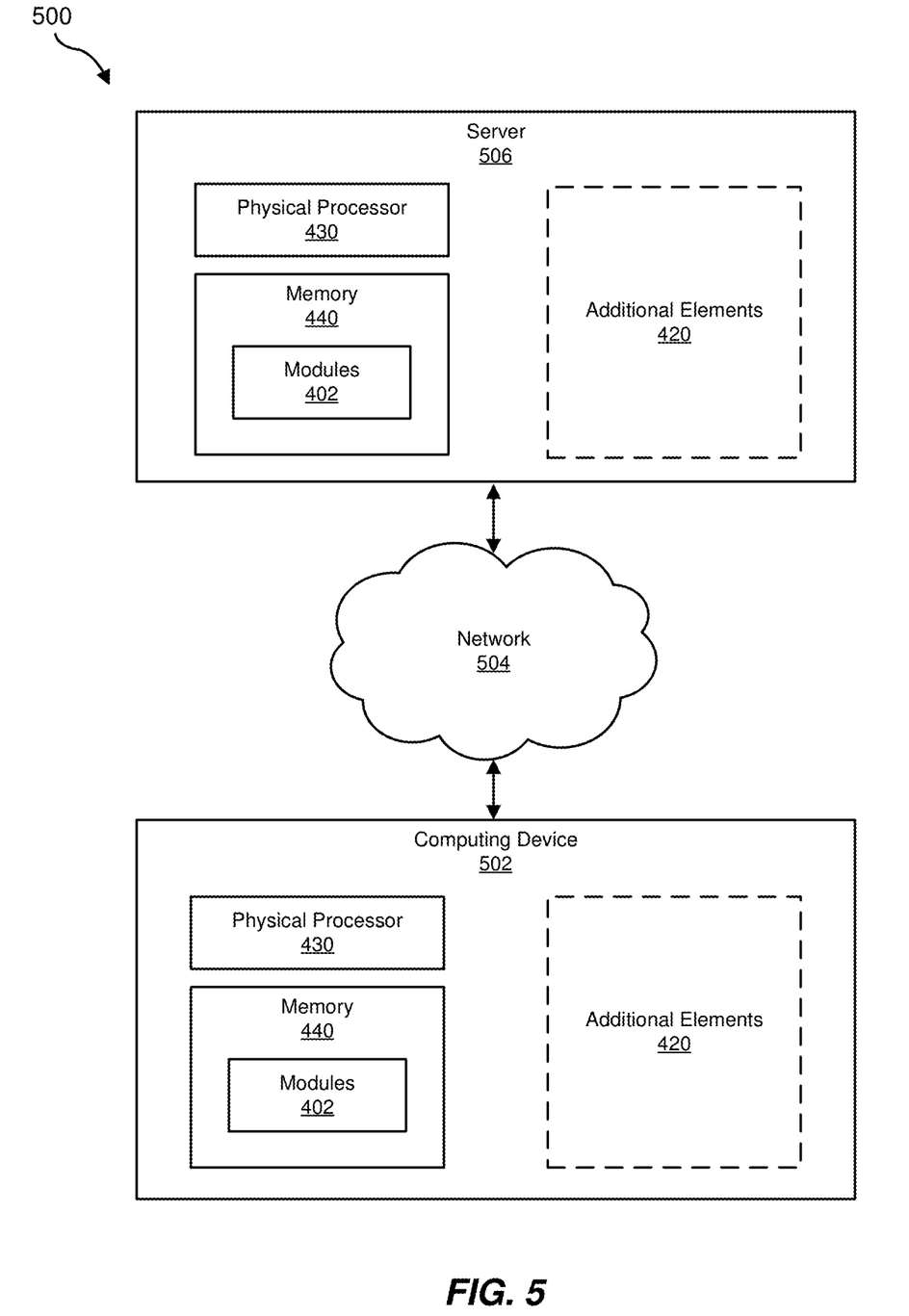
FIG. 5 is a block diagram of an exemplary network for shot-change detection using container level information.

FIG. 2 is a flow diagram of an exemplary computer-implemented method 200 for shot-change detection using container level information. The steps shown in FIG. 2 may be performed by any suitable computer-executable code and/or computing system, including the system(s) illustrated in FIGS. 4 and/or 5. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may, for a current frame of a sequence of video frames, determine a frame type label of the current frame. For example, a frame module 404 in FIG. 4 may determine a frame type label of a current frame 422.

Various systems described herein may perform step 210. FIG. 4 is a block diagram of an example system 400 for shot-change detection using container level information. As illustrated in this figure, example system 400 may include one or more modules 402 for performing one or more tasks. As will be explained in greater detail herein, modules 402 may include frame module 404, a decoding module 406, an analysis module 408, and a processing module 410. Although illustrated as separate elements, one or more of modules 402 in FIG. 4 may represent portions of a single module or application.

In certain embodiments, one or more of modules 402 in FIG. 4 may represent one or more software applications or programs that, when executed by a computing device, may cause the computing device to perform one or more tasks. For example, and as will be described in greater detail below, one or more of modules 402 may represent modules stored and configured to run on one or more computing devices, such as the devices illustrated in FIG. 5 (e.g., computing device 502 and/or server 506). One or more of modules 402 in FIG. 4 may also represent all or portions of one or more special-purpose computers configured to perform one or more tasks.

As illustrated in FIG. 4, example system 400 may also include one or more memory devices, such as memory 440. Memory 440 generally represents any type or form of volatile or non-volatile storage device or medium capable of storing data and/or computer-readable instructions. In one example, memory 440 may store, load, and/or maintain one or more of modules 402. Examples of memory 440 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 440. Additionally or alternatively, physical processor 430 may execute one or more of modules 402 to facilitate maintain the mapping system. Examples of physical processor 430 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 4, example system 400 may also include one or more additional elements 420, such as current frame 422, decoded current frame 423, frame data 424, and shot data 426. Current frame 422, decoded current frame 423, frame data 424, and/or shot data 426 may be stored on a local storage device, such as memory 440, or may be accessed remotely. Current frame 422 may represent a frame of a video frame sequence currently being processed, as will be explained further below. Frame data 424 may represent data corresponding to various aspects of frames for the video frame sequence, such as historical I-frame data, frame sizes, etc., as will be explained further below. Shot data 426 may represent data corresponding to shot boundaries and/or shot-change frames, as will be explained further below.

Example system 400 in FIG. 4 may be implemented in a variety of ways. For example, all or a portion of example system 400 may represent portions of example network environment 500 in FIG. 5.

FIG. 5 illustrates an exemplary network environment 500 implementing aspects of the present disclosure. The network environment 500 includes computing device 502, a network 504, and server 506. Computing device 502 may be a client device or user device, such as a mobile device, a desktop computer, laptop computer, tablet device, smartphone, or other computing device. Computing device 502 may include a physical processor 430, which may be one or more processors, memory 440, which may store data such as one or more of additional elements 420 as well as one or more of modules 402.

Server 506 may represent or include one or more servers capable of processing and/or hosting video files. Server 506 may include a physical processor 430, which may include one or more processors, memory 440, which may store modules 402, and one or more of additional elements 420.

Computing device 502 may be communicatively coupled to server 506 through network 504. Network 504 may represent any type or form of communication network, such as the Internet, and may comprise one or more physical connections, such as LAN, and/or wireless connections, such as WAN.

Returning to FIG. 2, the systems described herein may perform step 210 in a variety of ways. In one example, current frame 422 may include metadata indicating a type of frame, such as intra frame (e.g., I-frame) or inter frame (e.g., P-frame or B-frame). In one example, frame data 424 may include metadata identifying a type for each frame. In other examples, a content of current frame 422 itself may be used to identify the frame type. For instance, an I-frame may include data of a complete picture. A P-frame and/or B-frame may include differences (e.g., motion data) with reference to one or more other frames.

At step 220 one or more of the systems described herein may, in response to determining that the current frame is labeled as an intra frame (I-frame), decode the current frame.

For example, decoding module 406 may decode current frame 422, generating decoded current frame 423, after frame module 404 identifies current frame 422 as an I-frame.

The systems described herein may perform step 220 in a variety of ways. In one example, decoding current frame 422 may include decompressing current frame 422 into raw pixel data.

At step 230 one or more of the systems described herein may compare the decoded frame to historical I-frame data, which may include a previous P-frame and/or B-frame that has previously been identified as a shot-change frame (e.g., by processing module 410 as will be further explained below). For example, analysis module 408 may compare decoded current frame 423 to historical I-frame data in frame data 424.

The systems described herein may perform step 230 in a variety of ways. In one example, analysis module 408 may compare decoded current frame 423 to one or more prior shot-change frames producing at least one of a histogram of differences ("HOD") or a difference of histograms ("DOH") with one or more prior shot-change frames. Frame data 424 may include data of one or more prior shot-change frames, which may be frames previously identified as shot-change frames and stored in frame data 424. Analysis module 408 may use HOD, DOH, pixel analysis, or other similar techniques to determine a similarity between decoded current frame 423 and prior shot-change frames. In some examples, particularly when current frame 422 corresponds to the first I-frame, historical I-frame data may not be available such that the comparison may be obviated.

At step 240 one or more of the systems described herein may, in response to the comparison satisfying a shot-change threshold, flag the current frame as a shot-change frame. For example, processing module 410 may indicate that current frame 422 is a shot-change frame in response to satisfying the shot-change threshold.

The systems described herein may perform step 240 in a variety of ways. In one example, the shot-change threshold may correspond to a similarity threshold between decoded current frame 423 and one or more previous shot-change frames stored in frame data 424. Processing module 410 may flag current frame 422 as the shot-change frame, for example, by updating metadata corresponding to current frame 422. In some examples, the metadata may be stored in current frame 422. In other examples, the metadata may be stored in shot data 426, which may include shot boundary data.

In some examples, in response to the comparison not satisfying the shot-change threshold, processing module 410 may unflag current frame 422 as a shot-change frame. For example, if current frame 422 was previously identified as a shot-change frame, processing module 410 may update current frame 422 to remove the shot-change frame identification. Alternatively, processing module 410 may complete processing of current frame 422 and proceed to a subsequent frame such that current frame 422 does not get flagged as the shot-change frame.

At step 250 one or more of the systems described herein may, in response to flagging the current frame as the shot-change frame, store the current frame for a subsequent shot-change detection. For example, processing module 410 may store current frame 422 and/or decoded current frame 423 in frame data 424 for subsequent processing (see, e.g., step 230).

The systems described herein may perform step 250 in a variety of ways. In one example, processing module 410 may store decoded current frame 423 in frame data 424 such that current frame 422 may not require decoding for subsequent shot-change detections.

At step 260 one or more of the systems described herein may update, based on flagged shot-change frames, shot boundaries for the sequence of video frames. For example, processing module 410 may update shot boundaries defined in shot data 426.

The systems described herein may perform step 260 in a variety of ways. In one example, shot data 426 may explicitly enumerate shot-change frames as shot boundaries. In other examples, frame data 424 may include decoded frame data of shot-change frames to define shot boundaries.

Figure 3:
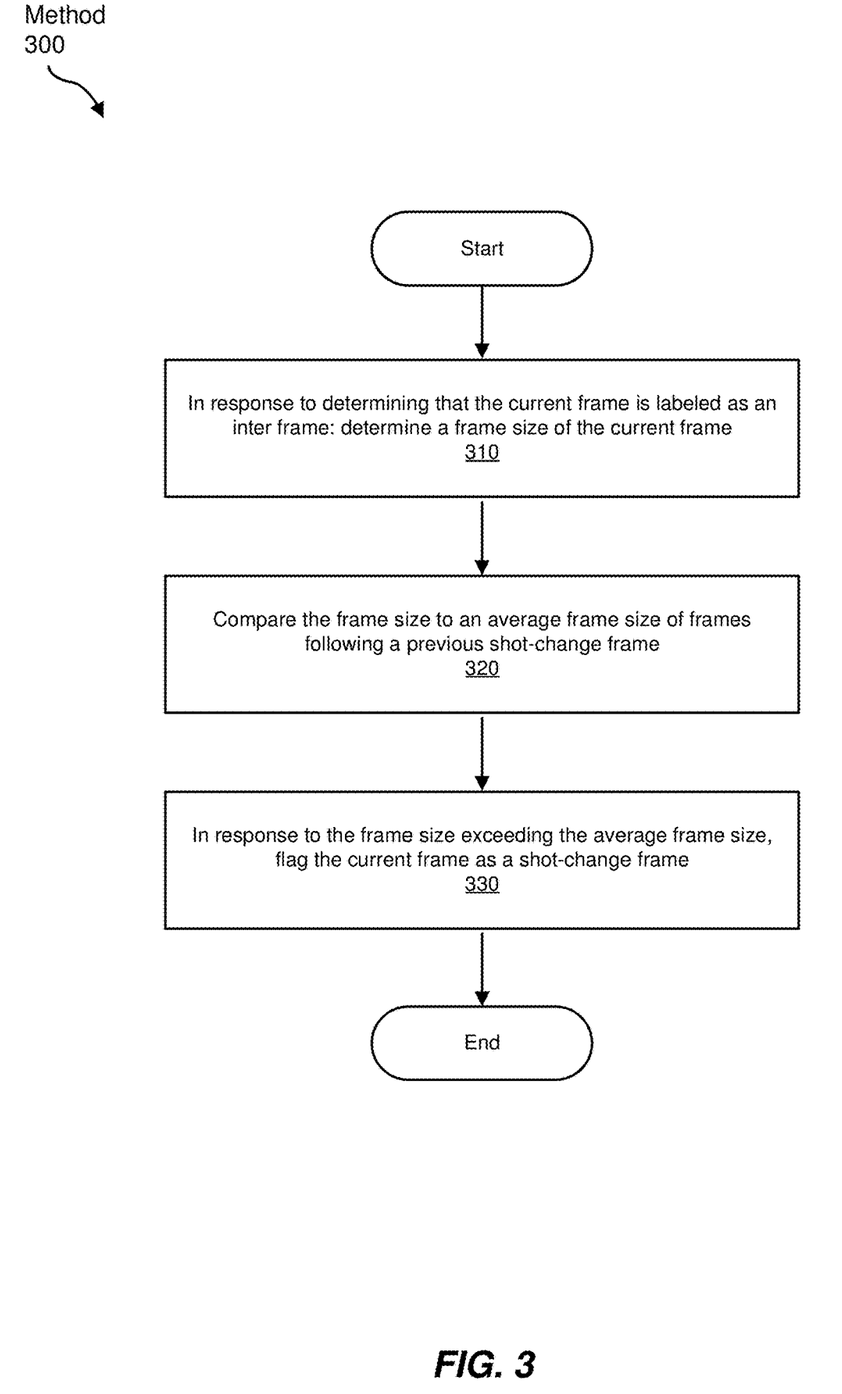
FIG. 3 is a flow diagram of another exemplary method for shot-change detection using container level information.

FIG. 3 is a flow diagram of an exemplary computer-implemented method 300 for shot-change detection using container level information. The steps shown in FIG. 3 may be performed by any suitable computer-executable code and/or computing system, including the system(s) illustrated in FIGS. 4 and/or 5. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may, in response to determining that the current frame is labeled as an inter frame, determine a frame size of the current frame. For example, frame module 404 may, in response to determining that current frame 422 is labeled as a P-frame or a B-frame, determine a frame size of current frame 422.

Figure 6:
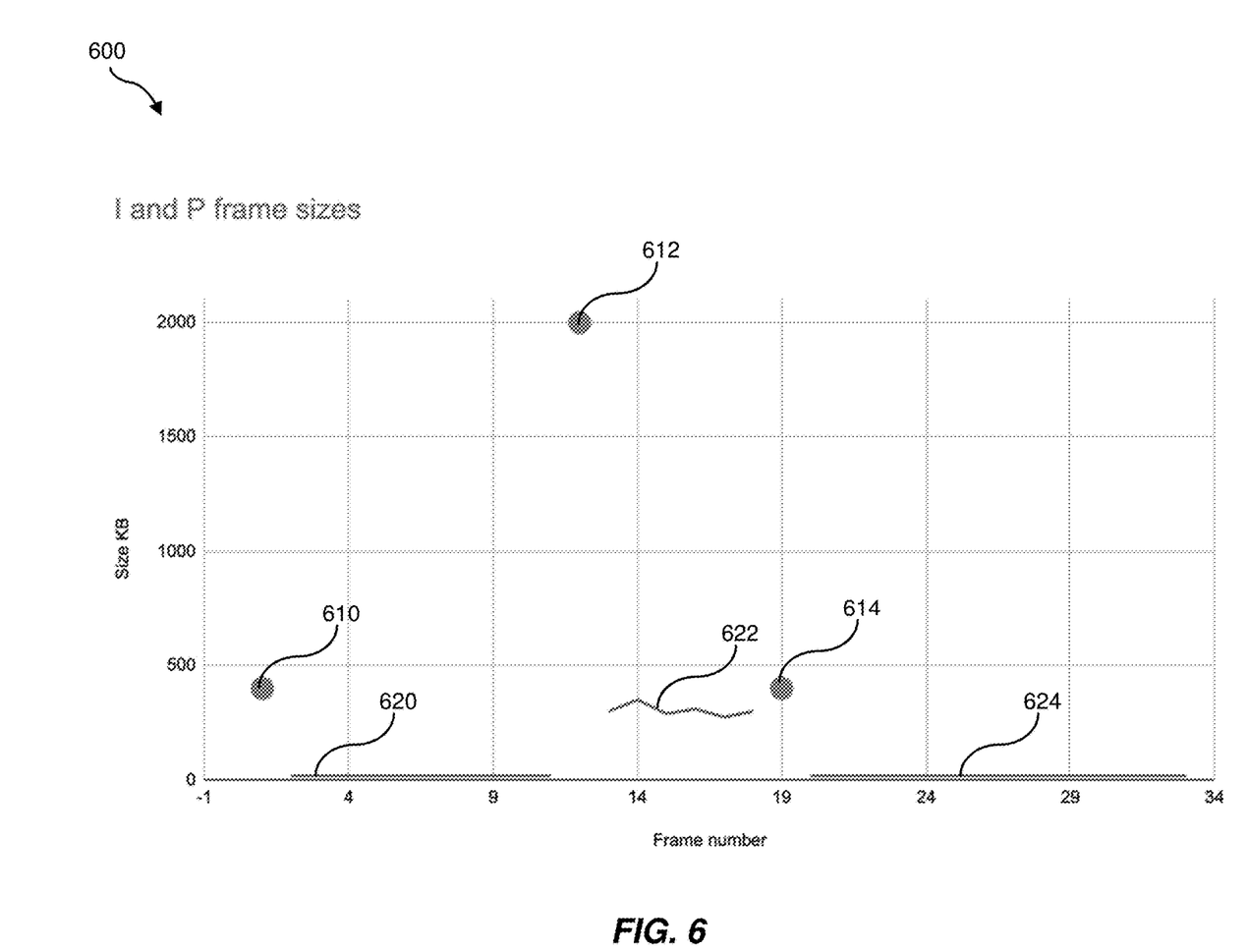
FIG. 6 is a graph of frame sizes.

FIG. 6 illustrates a graph 600 of example I-frame and P-frame sizes. The x-axis may correspond to frame number (e.g., an ordered frame sequence based on a Group of Pictures ("GOP") frame order). The y-axis may correspond to frame size in kilobytes ("KB"). Graph 600 illustrates an I-frame 610, an I-frame 612, and I-frame 614, a P-frame sequence 620 (having P-frames that may reference I-frame 610), a P-frame sequence 622 (having P-frames that may reference I-frame 612), and a P-frame sequence 624 (having P-frames that may reference I-frame 614). Each of P-frame sequence 620, P-frame sequence 622, and P-frame sequence 624 may include multiple consecutive P-frames.

As illustrated in FIG. 6, I-frames may generally have larger frame sizes than P-frames. Thus, I-frames (e.g., I-frame 610, I-frame 612, and I-frame 614) may be distinguished from P-frames (e.g., P-frame sequence 620, P-frame sequence 622, and P-frame sequence 624) based on frame size.

Returning to FIG. 3, the systems described herein may perform step 310 in a variety of ways. In one example, frame module 404 may determine a compressed frame size of current frame 422. In other examples, frame module 404 may determine a decompressed frame size of current frame 422.

At step 320 one or more of the systems described herein may compare the frame size to an average frame size of frames following a previous shot-change frame. For example, analysis module 408 may compare the frame size of current frame 422 to an average frame size which may be stored in frame data 424.

The systems described herein may perform step 320 in a variety of ways. In one example, the average frame size may correspond to a running average frame size of one or more frames following the previous shot-change frame and having a same frame type as the current frame. For example, for each frame type (e.g., P-frame and B-frame), frame module 404 and/or analysis module 408 may maintain a running average of N frames following a previous shot-change frame (e.g., the most recently identified shot-change frame, which may be an I-frame).

As illustrated in FIG. 6, P-frames may vary in size, which may correlate to a frame size of corresponding reference I-frames. For example, I-frame 610 and I-frame 614 may have frame sizes smaller than that of I-frame 612. Accordingly, P-frames of P-frame sequence 620 (which may reference I-frame 610) and P-frame sequence 624 (which may reference I-frame 614) may have frame sizes smaller than those of P-frames of P-frame sequence 622 (which may reference I-frame 612).

However, when comparing absolute frame sizes, the frame sizes of the P-frames in P-frame sequence 622 may be more similar to the frame sizes of I-frame 610 and I-frame 614 than the frame sizes of P-frame sequence 620 and P-frame sequence 624. As illustrated in FIG. 6, P-frames of the same P-frame sequence may have similar frame sizes, which may further have little to no correlation with frame sizes of different P-frame sequences. To more accurately represent the average frame size of the current P-frame sequence (which may correspond to frames of a current shot being processed), the average frame size may include frame sizes of P-frames following the nearest preceding shot-change frame, which may be an I-frame. Thus, for a given P-frame in P-frame sequence 622, the average frame size may include a running average of frame sizes for P-frames following I-frame 612. The average frame size may be stored in, for example, frame data 424.

At step 330 one or more of the systems described herein may, in response to the frame size exceeding the average frame size, flag the current frame as a shot-change frame. For example, analysis module 408 may flag current frame 422 as a shot-change frame in response to the frame size of current frame 422 exceeding the average frame size.

The systems described herein may perform step 330 in a variety of ways. In one example, exceeding the average frame size may include a threshold for exceeding the average frame size, rather than an absolute comparison. For example, the threshold may be 2× the average frame size such that analysis module 408 may flag current frame 422 as the shot-change frame if the frame size exceeds 2× the average frame size. In other examples, other thresholds may be used, such as other relative sizes (e.g., 3×, etc.), deltas (e.g., 500 kb), etc.

Current frame 422 having a frame size exceeding the average frame size may indicate that current frame 422 includes significant changes in pixel values from previous frames, which may further be indicative of a shot change. In some examples, due to encoding schemes, a frame that may be more appropriately labeled as an I-frame (e.g., because of an amount of visual data being changed) may be incorrectly labeled and encoded as a P-frame or B-frame. Some shot-detection techniques may identify such mislabeled I-frames as shot-change frames by brute force analyzing every frame. However, such shot-detection techniques may require increasingly cost-prohibitive computing resources to analyze videos at scale.

Advantageously, the systems and methods described herein provide more efficient analysis. If the frame size of current frame 422 does not exceed the average frame size (e.g., is less than or equal to the average frame size), current frame 422 may be skipped so as not to incur additional processing overhead. For example, analysis module 408 may unflag current frame 422 as a shot-change frame.

In some examples, in response to flagging the current frame as the shot-change frame, decoding module 406 may decoding current frame 422 and store pixel values of decoded current frame 423 as an I-frame. By decompressing current frame 422 into raw pixel data (e.g., decoded current frame 423), current frame 422 may be used as a reference frame, similar to an I-frame, for further processing of subsequent frames. In some examples, decoding module 406 may use a current Group of Pictures ("GOP") order for decoding current frame 422. Rather than using updated frame labels, decoding module 406 may refer to the original frame labels to correctly decode current frame 422.

In some examples, when determining shot-change frames (e.g., as part of one or more of steps 230-240 and/or 330 as described herein), a minimum temporal distance threshold between the previously identified shot-change frame and the currently identified shot-change frame may be considered. The minimum temporal distance threshold may define a minimum playback time (e.g., time during normal playback, which may correspond to one or more frames based on frames-per-second ("fps")) desired between consecutive shot changes. For example, some videos may exhibit at least 0.2-0.3 second between shot changes (which may translate to 6-8 frames at 30 fps). Thus, a minimum temporal distance threshold of 0.5 seconds may accordingly require at least 0.5 seconds between consecutive shot changes such that the currently identified shot-change frame may no longer be identified as a shot-change frame if a temporal distance to the previously identified shot-change frame does not satisfy the minimum temporal distance threshold (e.g., if the currently identified shot-change frame is within 0.5 second of the previously identified shot-change frame). In other examples, the minimum temporal distance threshold may be any other appropriate time value or may alternatively be defined as a number of frames.

The minimum temporal distance threshold may allow the systems and methods described herein to recover necessary statistics for the first few P-frames and/or B-frames following a shot change to facilitate more robust decisions for subsequent frames. Thus, as in the example described above, the minimum temporal distance threshold may be selected to exceed a local minimum shot change duration. In addition, because the human visual system may need a minimum time to understand a new shot or scene, it may be desirable for a shot-change duration to last up to a few seconds.

Thus, the systems and methods described herein may more efficiently detect shot-change frames by reserving more computationally intensive processing for "true" I-frames. As described herein, due to various encoding schemes and settings, frames may be incorrectly labeled as I-frames, P-frames, and/or B-frames. For example, an I-frame having raw pixel data that is not significantly different from raw pixel data of a previous I-frame may be more accurately labeled as a P-frame or B-frame. Conversely, a P-frame or B-frame having significant differences in raw pixel data as that of a corresponding reference frame may be more accurately labeled as an I-frame. By detecting and processing only "true" I-frames, the systems and methods described herein may reduce processing of P-frames and B-frames.

The invention is directed to efficient shot-change detection for video processing. Video content may be organized into shots, which may consist of a grouping of consecutive frames of sufficient similarity. A shot change may correspond to, for example, a change in camera view such as a pan or cut. Detecting shot changes may be useful because when encoding the video content, the resulting video quality may be improved by applying different encoder settings to different shots. Some shot-change detection of a video may require decoding every frame of the video and performing pixel analysis on each frame, which may be prohibitively resource intensive. The present invention provides more efficient shot-change detection by leveraging characteristics of I-frames (e.g., key frames that do not refer to other frames), P-frames and B-frames (e.g., frames that are defined in reference to other frames) present in videos. By decoding only frames labeled as I-frames, the present invention may reduce the overall number of frames decoded. The present invention further appropriately reassigns frames as I-frames to better align with shot changes as well as provide additional encoding optimizations.

Example Embodiments

Example 1: A computer-implemented method comprising, for a current frame of a sequence of video frames: (i) determining a frame type label of the current frame; (ii) in response to determining that the current frame is labeled as an intra frame (I-frame): (a) decoding the current frame; (b) comparing the decoded frame to historical I-frame data; (c) in response to the comparison satisfying a shot-change threshold, flagging the current frame as a shot-change frame; and (d) in response to flagging the current frame as the shot-change frame, storing the current frame for a subsequent shot-change detection; and (iii) updating, based on flagged shot-change frames, shot boundaries for the sequence of video frames.

Example 2: The method of Example 1, further comprising, in response to the comparison not satisfying the shot-change threshold, unflagging the current frame as a shot-change frame.

Example 3: The method of Example 1 or 2, wherein comparing the decoded frame to historical I-frame data further comprises comparing the decoded frame to at least one of a histogram of differences (HOD) of one or more prior shot-change frames or a difference of histograms (DOH) with one or more prior shot-change frames.

Example 4: The method of Example 1, 2, or 3, further comprising, in response to determining that the current frame is labeled as an inter frame: determining a frame size of the current frame; comparing the frame size to an average frame size of frames following a previous shot-change frame; and in response to the frame size exceeding the average frame size, flagging the current frame as a shot-change frame.

Example 5: The method of Example 4, further comprising, in response to flagging the current frame as the shot-change frame: decoding the current frame; and storing pixel values of the decoded frame as an I-frame.

Example 6: The method of Example 4 or 5, further comprising, in response to the frame size being less than or equal to the average frame size, unflagging the current frame as a shot-change frame.

Example 7: The method of Example 4, 5, or 6, wherein the average frame size comprises a running average frame size of one or more frames following the previous shot-change frame and having a same frame type as the current frame.

Example 8. A system comprising: at least one physical processor; physical memory comprising computer-executable instructions that, when executed by the physical processor, cause the physical processor to, for a current frame of a sequence of video frames: (i) determine a frame type label of the current frame; (ii) in response to determining that the current frame is labeled as an intra frame (I-frame): (a) decode the current frame; (b) compare the decoded frame to historical I-frame data; (c) in response to the comparison satisfying a shot-change threshold, flag the current frame as a shot-change frame; and (d) in response to flagging the current frame as the shot-change frame, store the current frame for a subsequent shot-change detection; and (iii) update, based on flagged shot-change frames, shot boundaries for the sequence of video frames.

Example 9: The system of Example 8, wherein the computer-executable further comprise instructions that cause the physical processor to, in response to the comparison not satisfying the shot-change threshold, unflag the current frame as a shot-change frame.

Example 10: The system of Example 8 or 9, wherein comparing the decoded frame to historical I-frame data further comprises comparing the decoded frame to at least one of a histogram of differences (HOD) of one or more prior shot-change frames or a difference of histograms (DOH) with one or more prior shot-change frames.

Example 11: The system of Example 8, 9, or 10, wherein the computer-executable further comprise instructions that cause the physical processor to, in response to determining that the current frame is labeled as an inter frame: determine a frame size of the current frame; compare the frame size to an average frame size of frames following a previous shot-change frame; and in response to the frame size exceeding the average frame size, flag the current frame as a shot-change frame.

Example 12: The system of Example 11, wherein the computer-executable further comprise instructions that cause the physical processor to, in response to flagging the current frame as the shot-change frame: decode the current frame; and store pixel values of the decoded frame as an I-frame.

Example 13: The system of Example 11 or 12, wherein the computer-executable further comprise instructions that cause the physical processor to, in response to the frame size being less than or equal to the average frame size, unflag the current frame as a shot-change frame.

Example 14: The system of Example 11, 12, or 13, wherein the average frame size comprises a running average frame size of one or more frames following the previous shot-change frame and having a same frame type as the current frame.

Example 15: A non-transitory computer-readable medium comprising one or more computer-executable instructions that, when executed by at least one processor of a computing device, cause the computing device to, for a current frame of a sequence of video frames: (i) determine a frame type label of the current frame; (ii) in response to determining that the current frame is labeled as an intra frame (I-frame): (a) decode the current frame; (b) compare the decoded frame to historical I-frame data; (c) in response to the comparison satisfying a shot-change threshold, flag the current frame as a shot-change frame; and (d) in response to flagging the current frame as the shot-change frame, store the current frame for a subsequent shot-change detection; and (iii) update, based on flagged shot-change frames, shot boundaries for the sequence of video frames.

Example 16: The non-transitory computer-readable medium of Example 15, wherein the computer-executable further comprise instructions that cause the computing device to, in response to the comparison not satisfying the shot-change threshold, unflag the current frame as a shot-change frame.

Example 17: The non-transitory computer-readable medium of Example 15 or 16, wherein comparing the decoded frame to historical I-frame data further comprises comparing the decoded frame to at least one of a histogram of differences (HOD) of one or more prior shot-change frames or a difference of histograms (DOH) with one or more prior shot-change frames.

Example 18: The non-transitory computer-readable medium of Example 15, 16, or 17, wherein the computer-executable further comprise instructions that cause the computing device to, in response to determining that the current frame is labeled as an inter frame: determine a frame size of the current frame; compare the frame size to an average frame size of frames following a previous shot-change frame; and in response to the frame size exceeding the average frame size, flag the current frame as a shot-change frame.

Example 19: The non-transitory computer-readable medium of Example 18, wherein the computer-executable further comprise instructions that cause the computing device to, in response to flagging the current frame as the shot-change frame: decode the current frame; and store pixel values of the decoded frame as an I-frame.

Example 20: The non-transitory computer-readable medium of Example 18 or 19, wherein the computer-executable further comprise instructions that cause the computing device to, in response to the frame size being less than or equal to the average frame size, unflag the current frame as a shot-change frame.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive frame data to be transformed, transform the frame data, output a result of the transformation to detect I-frames, use the result of the transformation to detect shot-change frames, and store the result of the transformation to determine shot boundaries. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising, for a each frame of a sequence of video frames:
   determining a frame type label of a current frame;
   in response to determining that the current frame is labeled as an inter frame:
      determining a frame size of the current frame;

comparing the frame size to an average frame size of frames following a previous shot-change frame; and in response to the frame size exceeding the average frame size, flagging the current frame as a shot-change frame; and updating, based on flagged shot-change frames, shot boundaries for the sequence of video frames.

2. The method of claim 1, further comprising, in response to flagging the current frame as the shot-change frame:

decoding the current frame; and storing pixel values of the decoded frame as an I-frame.

3. The method of claim 1, further comprising, in response to the frame size being less than or equal to the average frame size, unflagging the current frame as a shot-change frame.

4. The method of claim 1, wherein the average frame size comprises a running average frame size of one or more frames following the previous shot-change frame and having a same frame type as the current frame.

5. The method of claim 1, further comprising, in response to determining that the current frame is labeled as an intra frame (I-frame):

decoding the current frame;

comparing the decoded frame to historical I-frame data;

in response to the comparison satisfying a shot-change threshold, flagging the current frame as a shot-change frame; and in response to flagging the current frame as the shot-change frame, storing the current frame for a subsequent shot-change detection.

6. The method of claim 5, further comprising, in response to the comparison not satisfying the shot-change threshold, unflagging the current frame as a shot-change frame.

7. The method of claim 5, wherein comparing the decoded frame to historical I-frame data further comprises comparing the decoded frame to at least one of a histogram of differences (HOD) of one or more prior shot-change frames or a difference of histograms (DOH) with one or more prior shot-change frames.

8. A system comprising:

at least one physical processor; and physical memory comprising computer-executable instructions that, when executed by the physical processor, cause the physical processor to, for each frame of a sequence of video frames:

determine a frame type label of a current frame, in response to determining that the current frame is labeled as an inter frame:

determine a frame size of the current frame;

compare the frame size to an average frame size of frames following a previous shot-change frame; and in response to the frame size exceeding the average frame size, flag the current frame as a shot-change frame; and update, based on flagged shot-change frames, shot boundaries for the sequence of video frames.

9. The system of claim 8, wherein the computer-executable further comprise instructions that cause the physical processor to, in response to flagging the current frame as the shot-change frame:

decode the current frame; and store pixel values of the decoded frame as an I-frame.

10. The system of claim 8, wherein the computer-executable further comprise instructions that cause the physical processor to, in response to the frame size being less than or equal to the average frame size, unflag the current frame as a shot-change frame.

11. The system of claim 8, wherein the average frame size comprises a running average frame size of one or more frames following the previous shot-change frame and having a same frame type as the current frame.

12. The system of claim 8, wherein the computer-executable further comprise instructions that cause the physical processor to, in response to determining that the current frame is labeled as an intra frame (I-frame):

decode the current frame;

compare the decoded frame to historical I-frame data;

in response to the comparison satisfying a shot-change threshold, flag the current frame as a shot-change frame; and in response to flagging the current frame as the shot-change frame, store the current frame for a subsequent shot-change detection.

13. The system of claim 12, wherein the computer-executable further comprise instructions that cause the physical processor to, in response to the comparison not satisfying the shot-change threshold, unflag the current frame as a shot-change frame.

14. The system of claim 12, wherein comparing the decoded frame to historical I-frame data further comprises comparing the decoded frame to at least one of a histogram of differences (HOD) of one or more prior shot-change frames or a difference of histograms (DOH) with one or more prior shot-change frames.

15. A non-transitory computer-readable medium comprising one or more computer-executable instructions that, when executed by at least one processor of a computing device, cause the computing device to, for each frame of a sequence of video frames:

determine a frame type label of a current frame;

in response to determining that the current frame is labeled as an inter frame:

determine a frame size of the current frame;

compare the frame size to an average frame size of frames following a previous shot-change frame; and in response to the frame size exceeding the average frame size, flag the current frame as a shot-change frame; and update, based on flagged shot-change frames, shot boundaries for the sequence of video frames.

16. The non-transitory computer-readable medium of claim 15, wherein the computer-executable further comprise instructions that cause the computing device to, in response to flagging the current frame as the shot-change frame:

decode the current frame; and store pixel values of the decoded frame as an I-frame.

17. The non-transitory computer-readable medium of claim 15, wherein the computer-executable further comprise instructions that cause the computing device to, in response to the frame size being less than or equal to the average frame size, unflag the current frame as a shot-change frame.

18. The non-transitory computer-readable medium of claim 15, wherein the computer-executable further comprise instructions that cause the computing device to, in response to determining that the current frame is labeled as an intra frame (I-frame):

decode the current frame;

compare the decoded frame to historical I-frame data;

in response to the comparison satisfying a shot-change threshold, flag the current frame as a shot-change frame; and in response to flagging the current frame as the shot-change frame, store the current frame for a subsequent shot-change detection.

19. The non-transitory computer-readable medium of claim 18, wherein the computer-executable further comprise instructions that cause the computing device to, in response to the comparison not satisfying the shot-change threshold, unflag the current frame as a shot-change frame.

20. The non-transitory computer-readable medium of claim 18, wherein comparing the decoded frame to historical I-frame data further comprises comparing the decoded frame to at least one of a histogram of differences (HOD) of one or more prior shot-change frames or a difference of histograms (DOH) with one or more prior shot-change frames.

* * * * *